United States Patent [19]

McKirdy

[11] 4,019,278
[45] Apr. 26, 1977

[54] DEVICE FOR THE APPLICATION OF CHEMICALS TO FIELD CROPS AND/OR OTHER PLANT CONCENTRATIONS

[76] Inventor: James A. McKirdy, 140 Oakdean Blvd., Winnipeg, Canada

[22] Filed: Feb. 19, 1976

[21] Appl. No.: 659,246

[30] Foreign Application Priority Data

Feb. 24, 1975 Canada .............................. 220668

[52] U.S. Cl. ................................................ 47/1.5
[51] Int. Cl.² ........................................ B05C 1/00
[58] Field of Search .......................... 47/1, 1.5, 1.7

[56] References Cited

UNITED STATES PATENTS

| | | | |
|---|---|---|---|
| 1,551,327 | 8/1925 | Pearce | 47/1.5 UX |
| 2,935,818 | 5/1960 | Crane | 47/1.5 |
| 3,198,396 | 8/1965 | Bailey | 47/1.5 X |
| 3,320,694 | 5/1967 | Biron | 47/1.5 |
| 3,560,102 | 2/1971 | Wetzel | 47/1.5 X |

Primary Examiner—Robert E. Bagwill
Attorney, Agent, or Firm—Stanley G. Ade

[57] ABSTRACT

Normally crops are sprayed with herbicide or the like by means of expensive and heavy spray bar equipment pulled or carried behind a tractor. The present device comprises a pair of spaced and parallel bars which include porous tubes or wick-like devices connected to a tank of herbicide or other chemical so that a film of the liquid chemical is maintained on the surface of the tubes. These are mounted transversely behind a tractor together with a supply tank and the tubes can be raised and lowered relative to the ground so that they can be drawn across the crops and adjusted so that the tubes engage the weeds but not the crops as the weeds normally grow higher than the crops in the initial growth stages.

12 Claims, 7 Drawing Figures

4,019,278

DEVICE FOR THE APPLICATION OF CHEMICALS TO FIELD CROPS AND/OR OTHER PLANT CONCENTRATIONS

BACKGROUND OF THE INVENTION

This invention relates to new and useful improvements in means of applying chemicals to crops and other plant concentrations.

Chemicals applied to crops include fertilizers, heribicides, insecticides, and fungicides.

Present methods of applying such chemicals include largely spraying, soil-incorporation, and seed treatment.

This invention will be described in particular as a means for treating weeds growing among crops, that is, as an applicator for herbicides.

However it will be apparent that the device may be used wherever the foliar application of a chemical to a crop may be useful.

Conventionally, relatively heavy and expensive spraying equipment is carried by or pulled behind a tractor and a plurality of spray nozzles sprays liquid herbicide or the like over both crops and weeds. This limits the types of herbicides that can be used as obviously a herbicide must be chosen which will kill the weeds but will not damage the crops. Furthermore it will be appreciated that considerable wasteage of herbicide takes place as both the crops and the weeds have to be contacted by the sprayed liquid herbicide in order to ensure that the weeds are killed.

With the cost of herbicides increasing, it is obviously desirable to provide a device which will reduce the amount of herbicide used.

SUMMARY OF THE INVENTION

The present invention overcomes the disadvantages inherent with conventional weed spraying assemblies by providing a device which can be drawn across the top of the weeds which normally extend above the new crop. The device includes means whereby a film of the herbicide is maintained on the surface of the weed bar which is wiped off by the contact of the weed bar with the tops of the weeds so that only the weeds are treated thus not only reducing the amount of herbicide used but also enabling a greater variety of herbicides to be applied.

Although the device is designed for use with weeds which extend above the height of the crops, nevertheless under certain circumstances it is desirable to apply the herbicide to weeds which are relatively short and which may not extend above the height of the crops. Under these circumstances of course, a selected herbicide can be used which will not damage the crops and the weed bar assembly can be adjusted so that both weed bars are the same height from the ground. This increases the rate of application to ensure that all weeds are treated.

However, under normal conditions, the device is adjusted so that only one of the weed bars is used upon weeds which extend above the height of the crop.

The principal object and essence of the invention is therefore to provide a device of the character herewithin described which can be secured to the rear of a tractor and can be operated by the source of hydraulic pressure normally provided by the tractor, for adjusting the height of the weed ar assemblies relative to the ground.

Another object of the invention is to provide a device of the character herewithin described in which the pair of weed bars can be adjusted in a fore and aft relationship relative to the ground depending upon the circumstances of application.

A still further object of the invention is to provide a device of the character herewithin described in which the liquid contained within a storage tank can be fed to the weed bar assembly either by gravity or by means of a relatively low pressure pump driven from the tractor.

A still further object of the invention is to provide a device of the character herewithin described which through its use will greatly reduce the wasteage of herbicide and hence reduce the chemical burden imposed on the environment.

Still another object of the invention is to provide a device of the character herewithin described which is simple in construction, economical in manufacture and otherwise well suited to the purpose for which it is designed.

With the foregoing objects in view, and other such objects and advantages as will become apparent to those skilled in the art to which this invention relates as this specification proceeds, my invention consists essentially in the arrangement and construction of parts all as hereinafter more particularly described, reference being had to the accompanying drawings to which:

DETAILED DESCRIPTION

Figure 3:
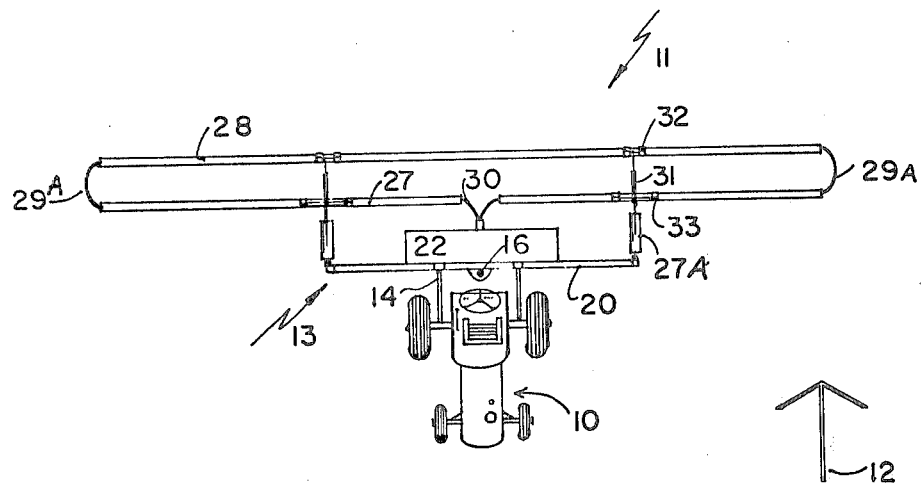
FIG. 3 is a view similar to FIG. 2 but showing the device secured to a tractor, the scale of FIG. 3 being reduced with respect to the remaining views.
Figure 6:
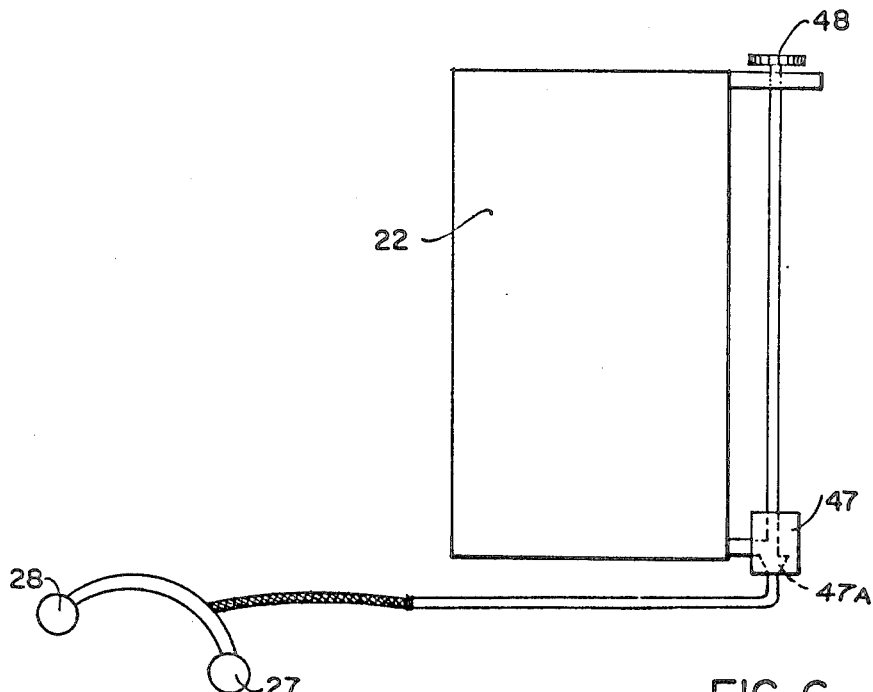
FIG. 6 is a fragmentary side elevation of the tank, filter unit, and control valve.

Proceeding therefore to describe the invention in detail, reference should first be made to FIG. 3 in which 10 illustrates schematically, a conventional tractor acting as a source of power although other equipment can of course be used to mount the weed bar assembly collectively designated 11.

In this particular embodiment, it is described that the tractor be driven rearwardly in the direction of arrow 12 with the device being mounted upon the rear of the tractor so that good visibility can be maintained.

However, if desired, the weed bar assembly 11 can be drawn behind the tractor but visability of operation is reduced.

The weed bar assembly collectively designated 11 includes supporting framework generally designated 13 and in this embodiment, the supporting framework includes a pair of spaced and parallel bars 14 having a plurality of apertures 15 in the distal ends thereof by which the supporting framework may be secured to the rear of the tractor 10 utilizing the conventional hitch pin assembly 16 together with supporting links 17.

A pair of spaced and parallel vertical members 18 extend upwardly from the ends 19 of the horizontal bars 14, and a cross member 20 extends between the upper end of these members 18 which, together with a further cross member 21 extending between the lower end of the members, forms a substantially rectangular frame adapted to support and carry a liquid holding tank 22 which may be secured to this frame by conventional means (not illustrated).

A pair of spaced and parallel links 23 are pivoted by one end 24 thereof to adjacent the extremities of the rectangular frame transverse lower member 19, pivot pins 25 forming this attachment.

These links extend rearwardly and downwardly and carry a weed bar assembly collectively designated 26.

A pair of fluid operators 27A are pivoted by the upper ends thereof to adjacent the extremities of the upper transvers member 20 of the rectangular frame and the piston rods 28A of these fluid operators are pivoted to intermediate the ends of the links 23 as indicated by pivots 29. These fluid operators are connected via hoses 30A to a source of hydraulic pressure upon the tractor 10 and the necessary controls are provided so that these fluid operators can be extended or retracted thus raising or lowering the weed bar assembly 26 relative to the ground.

Figure 4:
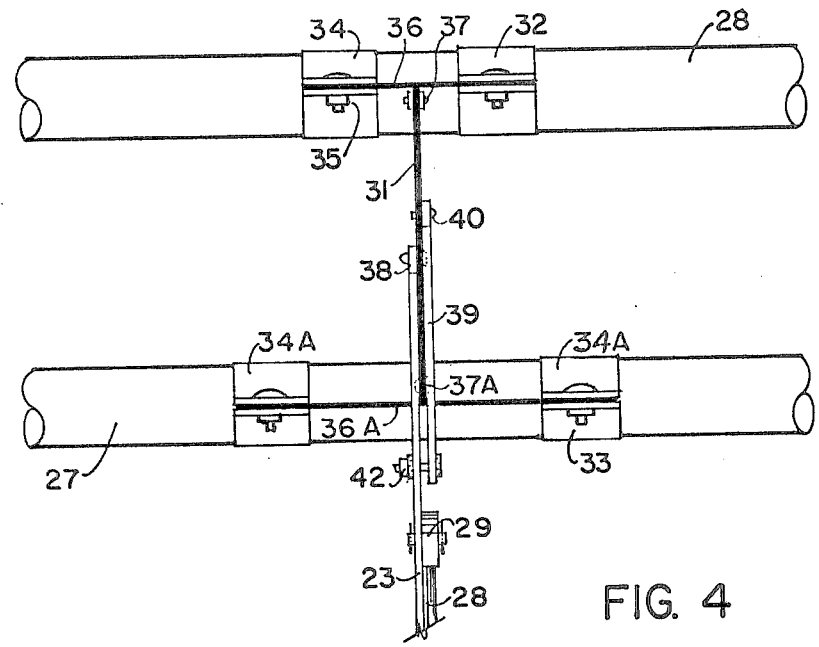
FIG. 4 is an enlarged fragmentary top plan view showing details of the clamps holding the weed bar tubes in the fixed or stationary embodiment.
Figure 5:
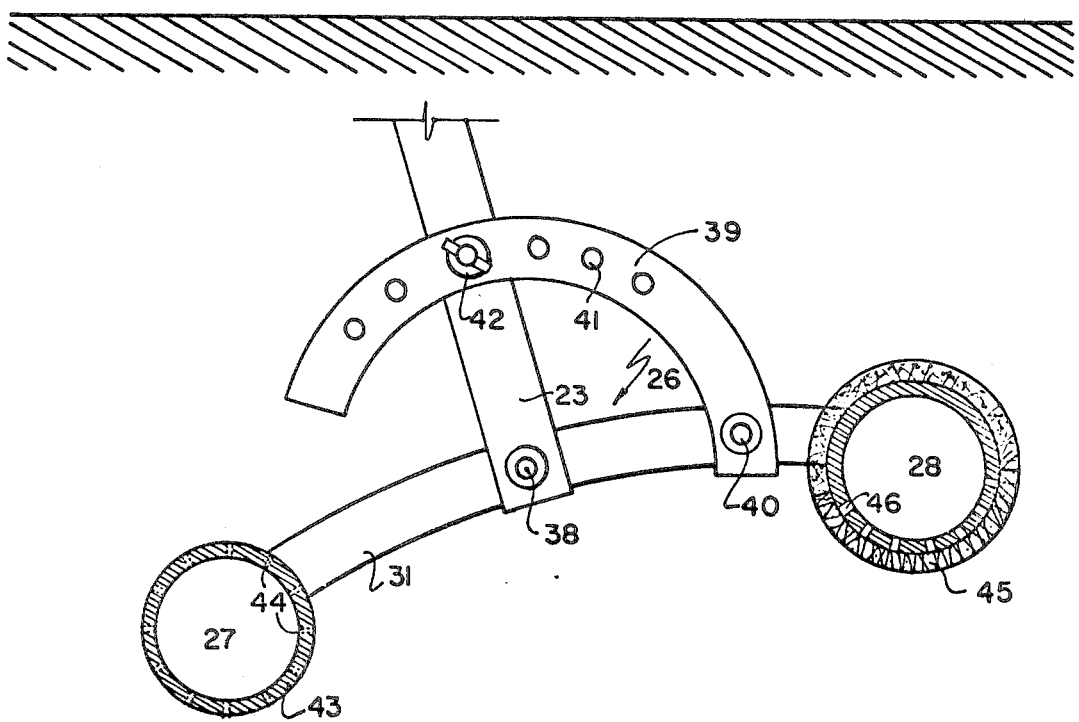
FIG. 5 is an enlarged fragmentary view showing the mounting of the weed bar assembly and showing two embodiments of the weed bar tubes which are illustrated in section.

Reference to FIGS. 4 and 5 will show details of the weed bar assembly 26.

A pair of spaced and parallel hollow tubes 27 and 28 extend transversely of the supporting framework 13 and are connected at the extremities thereof by means of curved tubular connections 29A.

Bar 27 is divided centrally thereof so that hose connections 30 may connect these ends to the tank 22 as will hereinafter be described.

The hollow tubes 27 and 28 are maintained in their spaced and parallel relationship and supported from the supporting framework and in this regard, a pair of arcuately curved links 31 are bolted to clamp assemblies 32 and 33 which extend around tubes 28 and 27 respectively as shown in FIGS. 3 and 4. In this embodiment, two such sets of clamps 32 and 33 are provided one upon each side of the longitudinal axis of the assembly.

In this embodiments, the clamp assemblies 32 include a pair of clamps 34 extending around the tube 28 and being bolted thereto by means of nut and bolt assemblies 35.

A plate 36 extends between the clamps 34 and the member or link 31 is bolted by one end thereof to this member 36, by means of nut and bolt assembly 37.

The clamp assemblies 33 are similar to clamps 34 but are spaced slightly farther apart and corresponding parts are given similar reference characters with the exception that the suffix 'A' is appended thereto.

The other end of the member 31 is secured to the member 36A by means of a nut and bolt assembly 37A and the other ends of links 23 are pivotally secured to the members 31 intermediate the ends thereof by means of a pivot bolt 38.

Means are provided to adjust the fore and aft relationship of the tubes 27 and 28 relative to the ground and in this connection, reference should be made to FIG. 5.

An arcuate bracket 39 is pivoted by one end thereof to the member 31, by means of pivot pin 40 situated adjacent the tube 28.

A plurality of apertures 41 is provided within this arcuate member 39 and a bolt assembly 42 engages through any one of these apertures and a corresponding apertures formed within the links 23 so that the fore and aft relationship of the tubes 27 and 28 may be adjusted by selecting the desired aperture 41.

The tubes 27 and 28 are constructed so that liquid contained within the tubes, feeds to the outer surfaces of the tubes and maintains a film thereon and in FIG. 5, two embodiments of this tube are shown.

Tube 27 is preferably made of plastic and is porous so that fluid will seep through the wall of the tube and maintain a film on the outer surface 43 thereof and in this connection, the radial extending dotted lines 44 indicate the porosity of the tube.

Tube 28 shows a hollow tube covered with a sleeve of cloth or wick-like material 45 and fed by means of drillings 46 through the wall of the tube so that it is always maintained in a moist condition.

Other methods of construction of the tube may of course be used and the two embodiments described are purely illustative.

The hose 30 connecting the two ends of tube 27 to one another and to the tank 22, is connected to an assembly 47 consisting of a filtering unit and a metering valve 47A which latter is actuated by means of a control know and rod assembly 48 and also connected to the base of tank 22 so that when the control know is opened, liquid flows by gravity through the assembly 47 and 47A, through the hose 30 to tube 27 and thence via the connecting tubes 29A, to the other tube 28.

Alternatively, a low pressure pump (not illustrated) may be incorporated between the tank and the hose 30 and operated from the source of power.

In operation, and assuming that the device is to be used on a crop in which the weeds are higher than the crop, the device is secured to the tractor and the tubes are adjusted fore and aft as illustrated in FIG. 5 with tube 27 being closer to the ground level than tube 28.

The valve control know 48 is adjusted to that the required flow of liquid herbicide or the like is fed to the tubes and through the walls of the tubes to maintain a film of herbicide on the outer surface 43 thereof or upon the cover 45 depending upon which embodiment is used.

The tractor is then driven through the crop and the height of the entire weed bar assembly is adjusted by means of the fluid operators 27A so that the tops of the weeds engage the weed bars.

If the weeds are short and intermingled with the crop, then it is preferable that the tubes 27 and 28 be adjusted so that they are both the same height from the ground whereupon the device engages both crop and weeds with a herbicide chosen to act upon the weeds but not upon the crop.

Figure 2:
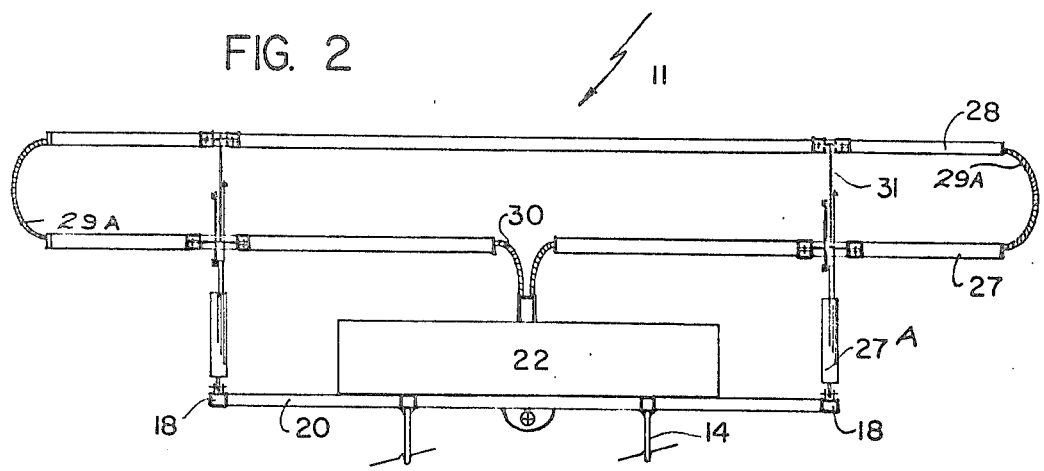
FIG. 2 is a top plan view of the device.
Figure 7:
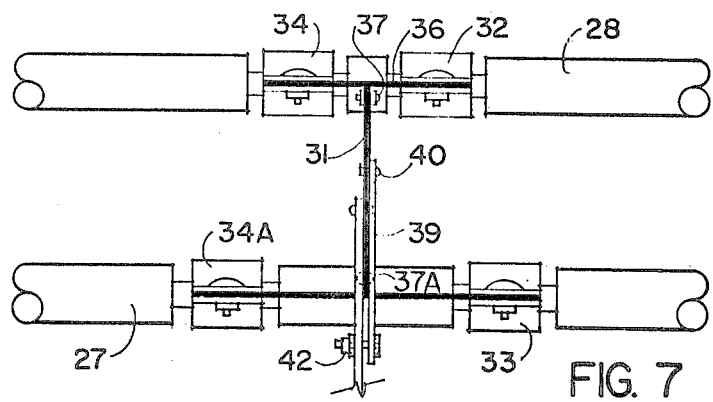
FIG. 7 is a view similar to FIG. 4 but showing the weed bar tubes in the rotatable embodiment.
Figure 1:
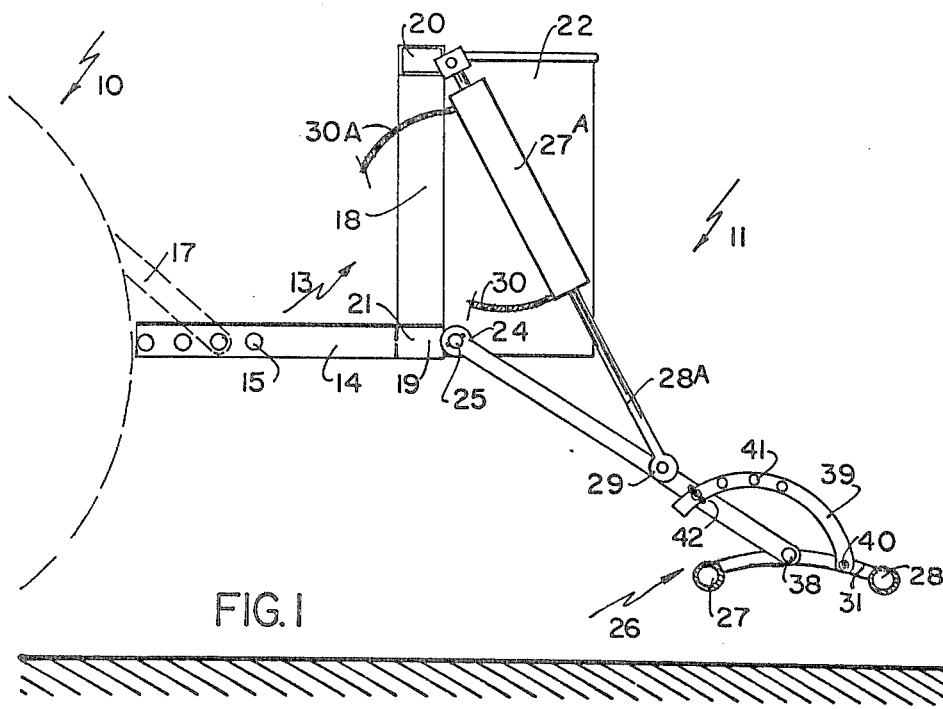
FIG. 1 is a side elevation of the device.

FIG. 7 shows a view similar to FIG. 4 but with the tubes 27 and 28 free to rotate due to frictional engagement with the foliage across which it is pulled. The construction is similar with the exception that leak-proof bearings mount the ends of the tubes within the clamps 32 and 33. Similar leak-proof bearings are of course provided between the tubes 27 and 28 and the connecting tubes 29A and between the tube 27 and the connecting hose 30. However as such bearings are well known and conventional in construction, further details thereof are not believed necessary. This construction facilitates the transfer of the herbicide to the foliage by utilizing all of the surface of the sleeve or wick-like material on the tubes 27 and 28.

The device is simple in construction and light in weight and is easily attached and detached from the source of power indicated by tractor 10.

Since various modifications can be made in my invention as hereinabove described, and many apparently widely different embodiments of same made within the spirit and scope of the claims without departing from such spirit and scope, it is intended that all matter contained in the accompanying specification shall be interpreted as illustrative only and not in a limiting sense.

What I claim as my invention is:

1. A weed bar assembly for use with a liquid such as a herbicide or the like adapted to be supported upon a source of power such as a tractor, said source of power including a source of hydraulic pressure; comprising in combination supporting framework, said supporting framework adapted to be operatively connected to said source of power, a tank associated with said framework for holding a supply of liquid, at least one hollow weed bar assembly supported transversely by said supporting framework and extending upon each side thereof means to adjust the height of said week bar assembly relative to the ground, means operatively connecting said tank with the interior of said weed bar assembly, said weed bar assembly including means in the wall thereof for feeding said liquid through the wall to maintain a film of said liquid upon the outer surface of said wall, said weed bar assembly including a pair of spaced and parallel tubes, means to adjust the fore and aft relationship of said tubes relative to the ground, said means to adjust the height of said weed bar assembly relative to the ground including a pair of links pivoted by one end thereof to said supporting structure and being pivotally connected by the other ends thereof to said weed bar assembly, and a fluid operator extending between said supporting framework and said weed bar assembly and being operatively connected to said source of hydraulic pressure whereby extension and retraction of said fluid operator pivots said links around said one end thereof thereby raising and lowering said weed bar assembly relative to the ground.

2. The weed bar assembly according to claim 1 in which said means in said wall for feeding said liquid therethrough includes said tube being formed of a porous material.

3. The weed bar assembly according to claim 2 in which said means to adjust the fore and aft relationship of said assembly relative to the ground includes an arcuate support bracket extending between said links and said assembly and means to adjust and selectively hold the position of said arcuate support relative to the said links whereby said assembly is rocked fore and aft to the desired position relative to the ground.

4. The assembly according to claim 3 in which said tubes are journalled for free rotation around the longitudinal axis of said tube.

5. The assembly according to claim 2 in which said tubes are journaled for free rotation around the longitudinal axes of said tubes.

6. The weed bar assembly according to claim 1 in which said means in the wall for feeding said liquid through said wall includes an absorbent wick-like cover surrounding said tube and liquid feed means extending through the wall of said tube along the length thereof.

7. The weed bar assembly according to claim 6 in which said means to adjust the fore and aft relationship of said assembly relative to the ground includes an arcuate support bracket extending between said links and said assembly and means to adjust and selectively hold the position of said arcuate support relative to the said links whereby said assembly is rocked fore and aft to the desired position relative to the ground.

8. The assembly according to claim 7 in which said tubes are journalled for free rotation around the longitudinal axis of said tube.

9. The assembly according to claim 6 in which said tubes are journalled for free rotation around the longitudinal axes of said tubes.

10. The weed bar assembly according to claim 1 in which said means to adjust the fore and aft relationship of said assembly relative to the ground includes an arcuate support bracket extending between said links and said assembly and means to adjust and selectively hold the position of said arcuate support relative to the said links whereby said assembly is rocked fore and aft to the desired position relative to the ground.

11. The assembly according to claim 10 in which said tubes are journalled for free rotation around the longitudinal axis of said tube.

12. The assembly according to claim 1 in which said tubes ae journalled for free rotation around the longitudinal axis of said tube.

* * * * *